April 21, 1964  J. JONES-HINTON ETAL  3,130,406
RADAR REFLECTORS AND LIFE RAFTS INCORPORATING SAME
Filed May 1, 1959 3 Sheets-Sheet 1
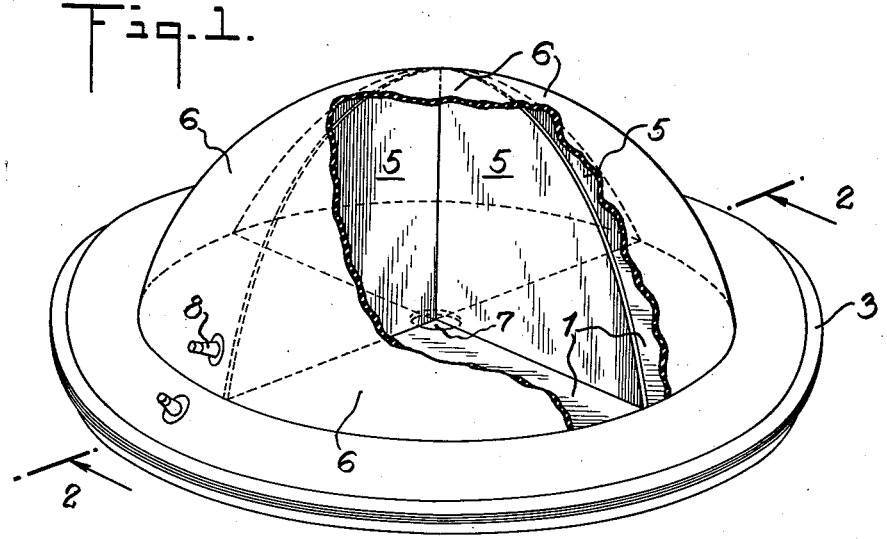
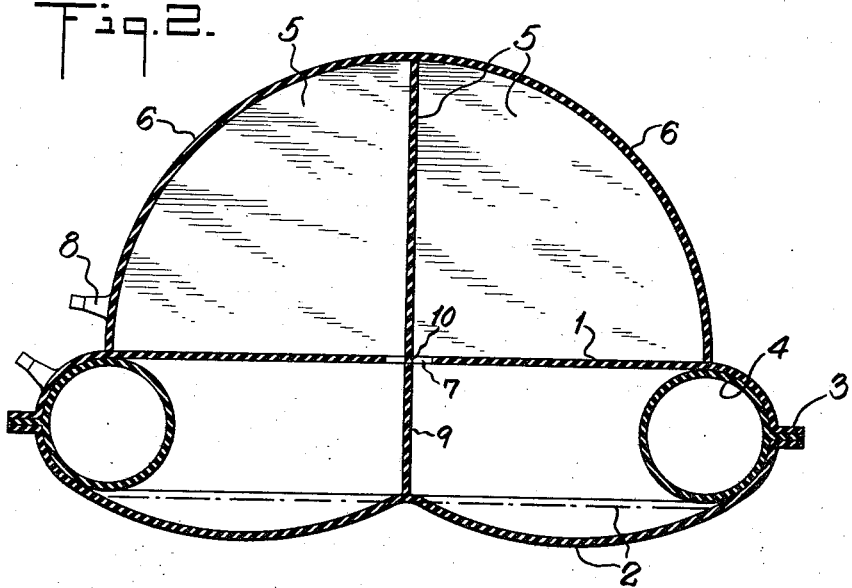
INVENTORS
JAMES JONES-HINTON
THOMAS EDWARD HORACE GRAY
BY
ATTORNEY April 21, 1964  J. JONES-HINTON ETAL  3,130,406
RADAR REFLECTORS AND LIFE RAFTS INCORPORATING SAME
Filed May 1, 1959
3 Sheets-Sheet 2

April 21, 1964     J. JONES-HINTON ETAL     3,130,406
RADAR REFLECTORS AND LIFE RAFTS INCORPORATING SAME
Filed May 1, 1959     3 Sheets-Sheet 3

INVENTORS
James Jones-Hinton
Thomas Edward Horace Gray
by Benj. T. Rauber
their attorney

United States Patent Office 3,130,406
Patented Apr. 21, 1964

3,130,406
RADAR REFLECTORS AND LIFE RAFTS
INCORPORATING SAME
James Jones-Hinton, Tanworth-in-Arden, Solihull, and
Thomas Edward Horace Gray, Wylde Green, Sutton
Coldfield, England, assignors to Dunlop Rubber Company Limited, London, England, a British company
Filed May 1, 1959, Ser. No. 810,333
Claims priority, application Great Britain May 3, 1958
11 Claims. (Cl. 343—18)

This invention relates to reflectors for radio waves such as, for example, radar signals.

It has been proposed to construct collapsible radio reflectors from flexible radio reflective material for example textile fabric with a metallic coating, which is supported in a taut and flat condition when required for use by a framework of rigid members.

When such reflectors are collapsed the flexible material can be compactly folded for storage but the rigid members frequently lead to packing and storage difficulties.

According to the present invention a reflector for radio waves comprises a sheet of flexible radio reflective material secured by its periphery to an inflatable member which on inflation will hold the sheet taut and flat.

Preferably the inflatable member is an endless tube encircling the sheet.

In order to reinforce the structure and restrain any tendency of the endless tube to warp or twist as it is inflated or during use, another flexible sheet, of approximately the same dimensions as the sheet of radio reflective material, may be secured by its periphery to the tube, the two sheets sandwiching the tube between them, the arrangement being such that on inflation of the tube at least the reflective sheet is held taut and flat. The second-mentioned flexible sheet is preferably substantially non-reflective to radio waves so as to avoid any possible interference with the performance of the first-mentioned reflective sheet.

Further sheets of flexible radio reflective material may be connected to the first-mentioned sheet or the encircling tube and secured at some or all of their free edges to one or more inflatable members which on inflation will hold the further sheets in a taut and flat condition and in desired relation to the first-mentioned sheet. For example the further sheets may be secured by their edges to the first-mentioned sheet.

The first-mentioned sheet is preferably circular and the endless tube toroidal, since this shape provides for substantially uniform expansion in a radial direction on inflation, whereby any tendency of the sheet to crease as the tube is inflated is counteracted. It is of normal inner diameter when inflated slightly greater than the diameter of the first-mentioned sheet so that when the sheet is attached to it and the tube is inflated the sheet is held under tension.

The basic reflector provided by the invention, the single sheet and encircling tube, can be used for reflecting radio signals, but it is important that the plane of the sheet should be correctly positioned with respect to the direction of the incoming signal to transmit the reflected signal in the desired direction. For example in the case of radar reflection where it is normally essential that the signal should be reflected along or parallel to its incoming path the plane of the sheet must be held perpendicular to the direction of the received signal.

A more satisfactory type of reflector for radar purposes is that known as a "corner" reflector, comprising three plane reflective surfaces mutually at right angles to each other. Such a reflector has the known property of reflecting signals directed into its apex from any direction within the solid angle defined by the planes of its reflecting surfaces so that the reflected signal returns parallel to its incoming path.

The invention is illustrated by way of example by the accompanying drawings in which:

FIG. 1 is a perspective view of a substantially hemispherical, inflatable, radar reflector as inflated embodying our invention and comprising a cluster of four corner reflectors and a reinforced base, parts being shown broken away to show the interior construction, FIG. 2 is a sectional elevation on a vertical plane passing through the line 2—2 of FIG. 1, FIG. 3 is a perspective view of an inflatable liferaft incorporating the radar reflector of FIG. 2;

Figure 4:
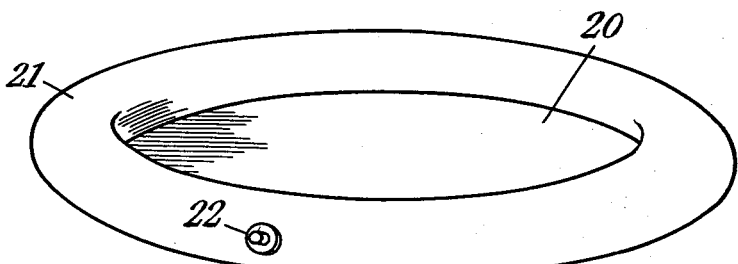
FIG. 4 shows a basic planar radar reflector.

Referring first to FIGURE 4, this illustrates a basic reflector as referred to above comprising a single circular sheet of flexible radio reflective material 20 secured by its periphery to an encircling toroidal inflatable tube 21. The tube has an inflation valve 22 and the toroid is of normal inside diameter when inflated somewhat larger than that of the sheet 20 so that when so secured and when the tube is inflated the sheet is held taut and flat with no tendency to crease.

Figure 5:
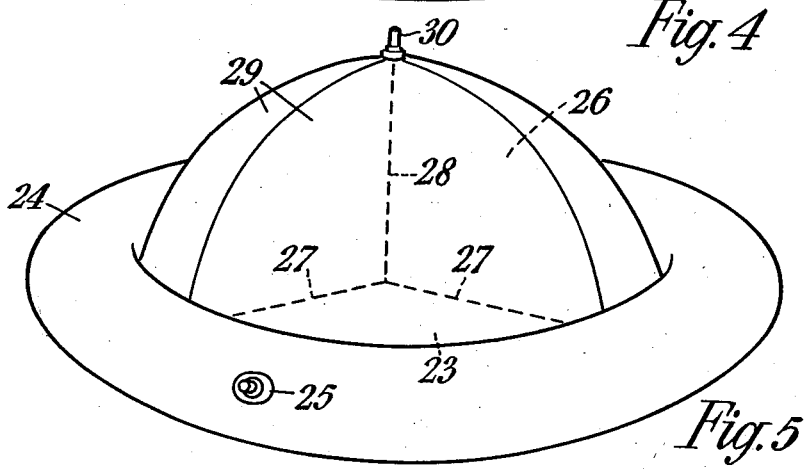
FIG. 5 shows an alternative reflector in which a cluster of four corner reflectors is supported by an inflatable hemisphere.

FIGURE 5 shows a reflector in the form of a cluster of four corner reflectors. This comprises a circular base sheet of flexible radio-reflective material 23, similar to the sheet 20, encircled by and secured around its edge to a toroidal inflatable tube 24 having an inflation valve 25 and of diameter such as to hold the sheet taut and flat when inflated. Four additional sheets 26 of flexible radio-reflective material, each of quadrantal shape, are secured to the base sheet 23, each by one radial edge 27 along perpendicular diameters of the base sheet so that their second radial edges 28 meet along the central perpendicular axis of the base sheet, where they are all secured together. Secured between the arcuate edges of each pair of adjacent quadrantal sheets 26 and around the periphery of the base sheet 23 between them is a sheet 29 of flexible but non-reflective material in the shape of a half quadrant of the surface of a sphere, the four sheets together forming a hemispherical chamber with the main sheet as its base. At the junction of the four octants 29 there is provided an inflation valve 30 with connections to each of the four cells of the hemispherical chamber formed between the quadrantal sheets 26 so that the chamber can be inflated to hold the quadrantal sheets 26 flat and in the desired position perpendicular to the base sheet 23 which is held flat by its encircling tube 24, and mutually perpendicular to each other. This arrangement provides four "corner" reflectors with the main sheet as their common base member.

Figure 6:
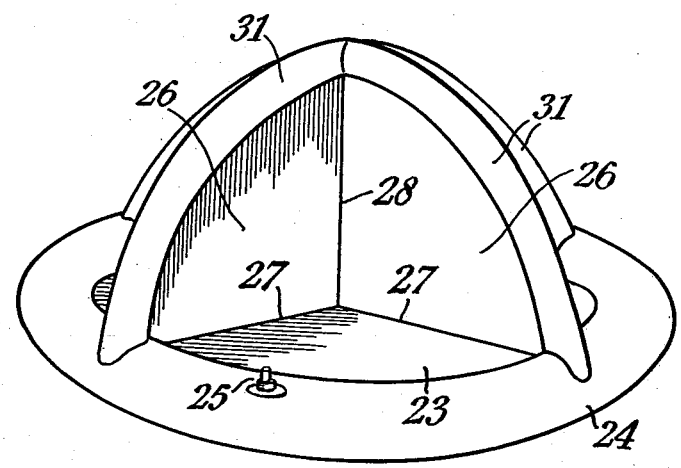
FIG. 6 shows a further alternative radar reflector comprising a cluster of four corner reflectors supported by arcuate inflatable tubes.

FIGURE 6 shows an alternative embodiment providing a reflector of similar configuration. This also comprises a circular base sheet 23 encircled by a toroidal tube 24 and four quadrantal sheets 26 assembled together as in the previous embodiment. In this embodiment, however, the arcuate edge of each quadrantal sheet is secured to an arcuate inflatable tube 31 joined to the main encircling tube 24 at one end and at its other end joining the three similar arcuate tubes. The inflatable structure then comprises the main toroidal tube 24 and four arcuate tubular branches 31 forming semicircular arches at right angles to each other and to the plane of the tube 24. In this construction, since all the tubes are connected together a single inflation valve 25 provides for the erection of the whole structure.

Figure 7:
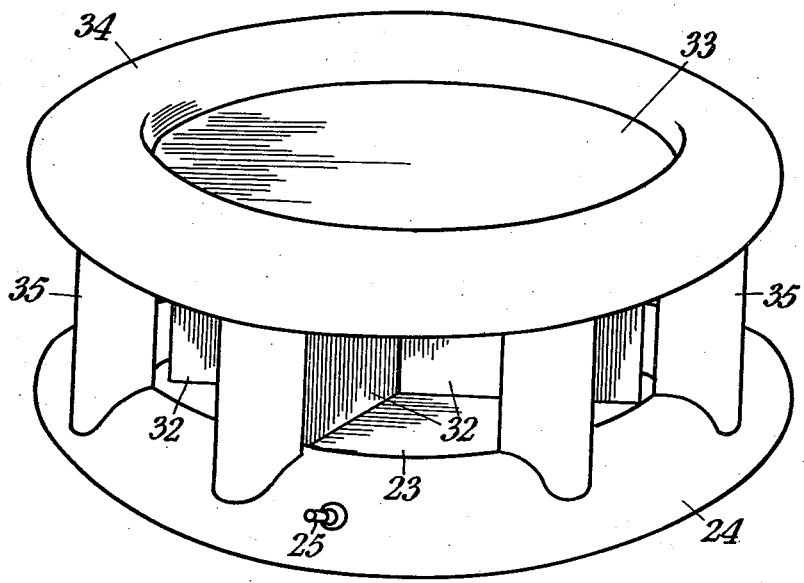
FIG. 7 shows another alternative radar reflector in which a cluster of four corner reflectors has upstanding rectangular sheets.

FIGURE 7 shows another embodiment providing four "corner" reflectors. This again comprises a circular base sheet 23 encircled by and secured to a toroidal inflatable tube 24 having a valve 25 but in this case the four additional sheets 32 defining the four "corner" reflectors are each rectangular but are secured together and to the base sheet 23 in the same manner as the quadrantal sheets 26 of the two previous embodiments. The edges of the sheets 32 parallel to but remote from the base sheet 23 are secured to a top sheet 33 which is of flexible but non reflective material and is encircled by and secured to an additional toroidal inflatable tube 34 in exactly the same manner as the base sheet 23 is encircled by the tube 24. The tubes 24 and 34 are connected together by a plurality of upright junction tubes 35 which are themselves inflatable and also provide inflation connections for the tube 34 from the tube 24. The junction tubes 35 are of normal inflated length slightly greater than the length of the sheets 32 in a direction perpendicular to the base sheet so that when inflated they tend to urge apart the tubes 34 and 24, and thus the top sheet 33 and base sheet 23 are urged apart so holding the sheets 32 taut in the direction perpendicular to the top and base sheets, and holding their common edge straight.

Instead of the junction tubes 35 for urging the two toroidal tubes apart, an intermediate toroidal tube, or more than one, may be used. This is positioned between the tubes 24 and 34 and has inflation connections to them.

FIGURES 1 and 2 show another embodiment providing four corner reflections in which the base is reinforced, and any tendency of the endless tube to warp or twist is restrained by an additional sheet secured to the endless tube. A circular sheet 1 of flexible radio reflective material and a similar sheet 2 of flexible but non-reflective material are secured together at their edges in a seam 3 so as to form an envelope for a toroidal inflatable tube 4, the median outer periphery of which is secured to the sheets 1 and 2 in the seam 3. The tube 4 is of normal outer diameter when inflated slightly greater than that of the sheets 1 and 2 so that when so secured to them and inflated it holds them taut and flat. In the drawings the tube is shown spaced from the sheets for clarity, since it is secured to both sheets, which are of the same size, it is constrained by them against any tendency to warp or twist which might crease the sheets. With this simple assembly which could be used as a reflector similar to that shown in FIGURE 4, the sheet 2 will lie in substantially the position shown in chain dotted line in FIGURE 1.

In FIGURES 1 and 2, four quadrantal sheets 5 of flexible radio-reflective material are secured by one radial edge of each along perpendicular diameters of the sheet 1 and are secured together by their other radial edges. Sheets 6 of flexible but non-reflective material in the shape of half quadrants of the surface of a sphere are secured to their curved edges and to the sheet 1 so forming a hemispherical chamber divided into four cells as in the embodiment of FIGURE 5. For convenience the sheets 6 may be constructed from two or more smaller sheets tailored to provide for the necessary curvature on inflation.

A hole 7 is cut in the centre of the sheet 1 so as to communicate with each of the four cells of the hemispherical chamber formed between the quadrantal sheets. An inflation valve 8 is provided in one of the octant sheets 6 so that the whole of the hemispherical chamber and the space between the sheets 1 and 2 can be inflated. The centre of the base sheet 2 is connected by a tie 9 through the hole 7 to the junction 10 of the four sheets 5.

As mentioned above, when the tube 4 is inflated the sheet 2 lies substantially flat in the position shown in chain dotted lines. On inflating the hemispherical chamber by means of the valve 8, the sheets 5 are erected and stretched into a taut and flat condition perpendicular to each other and to the sheet 1, as shown in the drawings. Since the space between the sheets 1 and 2 is inflated with the hemispherical chamber, by virtue of the hole 7 in the sheet 1, the pressure on each side of the sheet 1 is equal, so that it remains in its flat condition. The sheet 2 tends to be distorted downwardly by the inflation pressure, but is restrained by the tie 9. The tie 9 also serves to tension the axial junction of the sheets 5, to restrain any tendency to crease. Preferably the inflation pressure of the hemispherical chamber is less than, and must not be greater than, the pressure in the tube 4.

Reflectors as described above are valuable in life rafts, particularly inflatable life rafts, since normally the life raft itself is constructed of material which does not have high radio reflective properties and furthermore its height above the water is only a few feet which is not normally sufficient to enable it to be detected by radar due to the magnitude of the normal echoes produced by waves.

Figure 3:
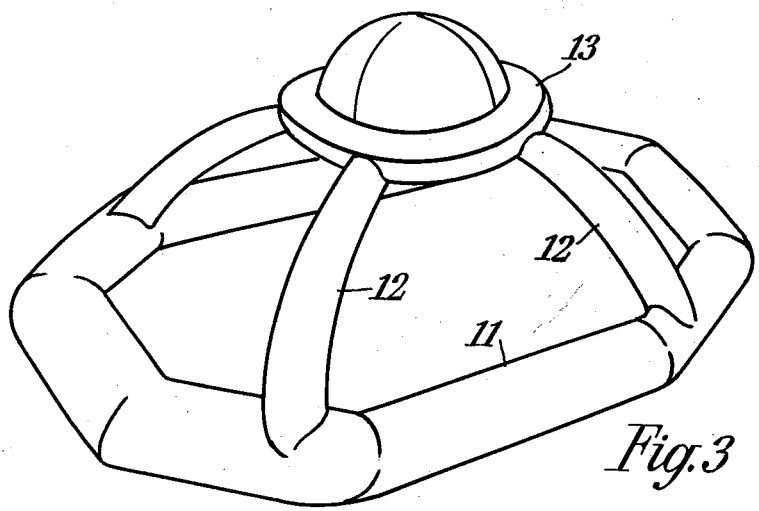

FIGURE 3 shows a reflector as illustrated in FIGURES 1 and 2 incorporated in the structure of a lift raft. The life raft shown in of the usual construction comprising a main inflatable member 11 defining the walls of the floating body and inflatable arches 12 supporting a canopy (not shown). The arches 12 connect at their upper ends with an annular tube 13 which in this case corresponds to the covered tube 4 of the reflector. The bottom sheet 2 of the reflector then forms a part of the canopy and the life raft is thus surmounted by an efficient reflector which greatly facilitates its detection by radar from searching vessels or aircraft. This construction has an advantage over other types of reflector which have been incorporated in life rafts in that the main support tube 13, being inflatable, is erected at the same time as the raft itself and does not require separate erection.

Also the absence of rigid support members is a particular advantage since the risk of puncture of the raft by such rigid members during storage is eliminated. After inflation of the raft the hemispherical reflector chamber can be inflated to a lesser pressure by a hand bellows or other convenient device.

For this, and other marine uses and preferably for all other uses, the reflectors are fitted with detachable flexible but non-reflective covers to prevent contamination of the reflective sheets by water.

In each embodiment, the inflatable tubes and flexible but non-reflective sheets are preferably formed from sheet polyvinyl chloride or other thermoplastic which can be secured together by heat sealing. Alternative flexible sheet material may be secured together by adhesive. The flexible radio reflective material may be textile fabric, such as nylon mesh with a coating of metal such as silver, or may be a metal foil, and may be secured to the inflatable tubes by adhesive, heat sealing, or other convenient means. The radio reflective material may be laminated to flexible plastic sheet for reinforcing it and for facilitating fabrication of it by heat sealing.

Having now described our invention, what we claim is:

1. A radar reflector for radio waves which comprises a circular sheet of flexible material having at least a circular central section reflective of radio waves, an inflatable endless tube encircling said sheet and secured along the periphery of said sheet to hold said central section of said sheet taut and flat upon inflation of said tube, a second circular sheet of flexible material secured at its periphery to said tube, said two sheets being disposed on opposite sides of said tube, four sheets of flexible material reflective to radio waves secured by their edges to the first mentioned circular sheet along intersecting lines lying in said first mentioned circular sheet and meeting and secured together on a line normal to the plane of said first mentioned circular sheet at the intersection of said intersecting lines, and means supported by said tube and inflatable therewith and secured to said four sheets to hold said four sheets taut, flat and perpendicular to each other and to said first mentioned circular sheet to form a cluster of four corner reflectors.

2. A reflector according to claim 1 in which said four sheets are quadrantal with curved outer edges.

3. A reflector according to claim 2 wherein said inflatable means is a hemispherical sheet of flexible material that does not reflect radio waves and is secured at its edge to said first mentioned circular sheet to form with said first mentioned circular sheet a fluid-tight inflatable chamber and wherein said curved outer edges of said four sheets are secured to the inner surface of said hemispherical sheet.

4. A reflector according to claim 2 wherein said inflatable means comprises four arcuate, inflatable, tubes each joined at one edge to said inflatable endless tube and joined together at their other ends so as to form on inflation two perpendicular semi-circular arches in the planes of said four sheets and in which each said four sheets is joined at its outer curved edge to one of said arcuate tubes.

5. A reflector according to claim 1 in which said inflatable means comprises a third circular sheet of flexible material that does not reflect radio waves and a second inflatable endless tube secured to the periphery of said third circular sheet which on inflation will hold said third circular sheet taut, flat and parallel to said first mentioned circular sheet, and in which said four sheets are secured by their edges to said first mentioned circular sheet and to said third mentioned circular sheet, means to space said first circular and third circular sheets to hold said four sheets taut and at right angles to said first mentioned and third mentioned circular sheets.

6. A reflector according to claim 5 wherein the means to space said first and third mentioned circular sheets comprises inflatable members secured between said endless tubes to hold said tubes spaced apart sufficiently to hold said four sheets taut and at right angles to said first mentioned circular sheet.

7. A reflector according to claim 6 in which said inflatable members holding said endless tubes spaced apart are tubes perpendicular to and joining said endless tubes.

8. A reflector according to claim 1 wherein said first mentioned circular sheet has an aperture to said means supported by said tube and inflatable therewith at the meeting edges of said four sheets for the passage of pressure medium to said inflatable means.

9. The reflector of claim 1 wherein said first mentioned circular sheet and said four sheets comprise sheets of metallic material laminated to flexible plastic material.

10. The reflector of claim 1 comprising means to connect the centers of said first and second mentioned circular sheets at spaced distances apart.

11. A radar reflector for radio waves which comprises a circular sheet of flexible material the central part at least of which is reflective to radio waves, an endless toroidal tube secured fluid-tightly to the perimeter of said sheet, said sheet having an aperture, a second sheet of flexible material secured air-tightly to said tube, said two sheets being disposed on opposite sides of said tube to form a first air-tight chamber, a hemi-spherical sheet of flexible material secured to and sealed at its periphery to said first-mentioned sheet to form with said first-mentioned sheet an inflatable, hemi-spherical, air-tight chamber in communication through said aperture with said first air-tight chamber, and at least one additional sheet of material reflective to radio waves secured in said hemispherical chamber to said hemispherical sheet and to said first mentioned sheet to be tensioned on inflation of said tube and said chambers.

References Cited in the file of this patent
UNITED STATES PATENTS

| | | |
|---|---|---|
| 2,463,517 | Chromak | Mar. 8, 1949 |
| 2,534,716 | Hudspeth et al. | Dec. 19, 1950 |
| 2,629,115 | Hansen | Feb. 24, 1953 |
| 2,780,806 | Van Alstyne | Feb. 5, 1957 |
| 2,784,425 | Bicknell | Mar. 12, 1957 |
| 2,888,675 | Pratt et al. | May 26, 1959 |

FOREIGN PATENTS

| | | |
|---|---|---|
| 717,034 | Germany | Feb. 4, 1942 |
| 812,376 | Great Britain | Apr. 22, 1959 |
| 845,027 | Great Britain | Aug. 17, 1960 |